(12) United States Patent
Nicholson et al.

(10) Patent No.: US 12,190,528 B2
(45) Date of Patent: Jan. 7, 2025

(54) AUTO-CROPPING OF IMAGES BASED ON DEVICE MOTION

(71) Applicant: Lenovo (Singapore) Pte. Ltd., Singapore (SG)

(72) Inventors: John W. Nicholson, Cary, NC (US); Daryl C. Cromer, Raleigh, NC (US); Howard Locker, Morrisville, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 396 days.

(21) Appl. No.: 17/845,910

(22) Filed: Jun. 21, 2022

(65) Prior Publication Data

US 2023/0410324 A1 Dec. 21, 2023

(51) Int. Cl.
| | |
|---|---|
| *G06T 7/215* | (2017.01) |
| *G06F 1/16* | (2006.01) |
| *G06T 7/246* | (2017.01) |
| *G06T 7/70* | (2017.01) |

(52) U.S. Cl.
CPC ............ *G06T 7/215* (2017.01); *G06F 1/1694* (2013.01); *G06T 7/246* (2017.01); *G06T 7/70* (2017.01); *G06T 2207/20132* (2013.01)

(58) Field of Classification Search
CPC ........... G06T 7/215; G06T 7/246; G06T 7/70; G06T 2207/20132; G06F 1/1694; H04N 23/61; H04N 23/611; H04N 23/69; H04N 5/2628

USPC ......................................................... 382/103
See application file for complete search history.

(56) References Cited

U.S. PATENT DOCUMENTS

| | | | | |
|---|---|---|---|---|
| 8,208,000 | B1 * | 6/2012 | Swanson ................. | H04N 7/14 348/14.08 |
| 9,712,751 | B2 * | 7/2017 | Williams ............... | H04N 23/80 |
| 10,951,858 | B1 * | 3/2021 | Ostap ..................... | H04N 7/147 |
| 11,049,511 | B1 * | 6/2021 | Seethaler ................ | G10L 25/78 |
| 11,336,817 | B2 * | 5/2022 | Ostap ..................... | H04N 23/69 |
| 2012/0105573 | A1 * | 5/2012 | Apostolopoulos ..... | H04N 7/142 348/E7.083 |
| 2016/0219217 | A1 * | 7/2016 | Williams ............... | H04N 23/80 |
| 2021/0051245 | A1 * | 2/2021 | Yu .......................... | H04N 23/57 |
| 2021/0306555 | A1 * | 9/2021 | Ostap ..................... | H04N 23/69 |
| 2022/0198774 | A1 * | 6/2022 | Wang ..................... | H04N 7/147 |

\* cited by examiner

*Primary Examiner* — Negussie Worku
(74) *Attorney, Agent, or Firm* — John M Rogitz; John L. Rogitz (57) ABSTRACT

In one aspect, a first device includes a processor, a camera, and storage. The storage includes instructions executable by the processor to auto-crop base images from the camera to render respective first auto-cropped images having a first field of view that is smaller than a second field of view of the respective base images themselves. The instructions are also executable to receive input from a motion sensor on the first device and, based on the input from the motion sensor, adjust the auto-cropping of the base images from the camera to render second auto-cropped images having a third field of view that is smaller than the second field of view and that is different from the first field of view. In various examples, the first and second auto-cropped images can be provided to a second device as part of a video conference.

20 Claims, 7 Drawing Sheets

AUTO-CROPPING OF IMAGES BASED ON DEVICE MOTION

FIELD

The disclosure below relates to technically inventive, non-routine solutions that are necessarily rooted in computer technology and that produce concrete technical improvements. In particular, the disclosure below relates to auto-cropping images based on device motion.

BACKGROUND

As recognized herein, a device can crop images from a camera to show a smaller field of view (FOV) during video conferencing. As also recognized herein, the device might use complex image processing software to identify a person's face to show in the cropped FOV. As part of that image processing, since the face might only be briefly obscured or the user might briefly turn their face away from the camera, the device will delay changing the cropped FOV based on the absence of the face because the image processing software does not want to react too quickly to transient facial absences, which in turn can cause a jittery effect for the viewer. Furthermore, the image processing is done at a relatively low frame rate to save on power, rather than processing every frame or a relatively high number of frames as that can consume undue amounts of power. However, as a result of the foregoing techniques, the disclosure below recognizes that when motion of the device results in a change of scene viewed by the camera for which the cropped FOV itself should quickly change to not cause jitter, the image processing software has undue latency in adjusting the cropped FOV to still show the person's face. There are currently no adequate solutions to the foregoing computer-related, technological problem.

SUMMARY

Accordingly, in one aspect a first device includes at least one processor, a camera accessible to the at least one processor, and storage accessible to the at least one processor. The storage includes instructions executable by the at least one processor to facilitate a video conference with a second device. While facilitating the video conference, the instructions are executable to auto-crop base images from the camera to render respective first auto-cropped images having a first field of view that is smaller than a second field of view of the respective base images themselves. The instructions also are executable to provide the first auto-cropped images to the second device as part of facilitating the video conference. During the video conference, the instructions are then executable to receive input from a motion sensor on the first device and, based on the input from the motion sensor, adjust the auto-cropping of the base images from the camera to render second auto-cropped images having a third field of view. The third field of view is smaller than the second field of view, and the third field of view is different from the first field of view. The instructions are then executable to provide the second auto-cropped images to the second device as part of facilitating the video conference.

In various example implementations, the first and second auto-cropped images may keep a person shown in the base images centered within the respective first and third fields of view. For example, the first and second auto-cropped images may keep the person centered horizontally and vertically, and/or may show different parts of a background behind the person.

In various example embodiments, the first device may include a laptop computer and the input from the motion sensor may include input from a potentiometer. So, for example, the input from the potentiometer may indicate movement of a first panel of the laptop computer with respect to a second panel of the laptop computer about one or more hinges of the laptop computer, with the first device rendering the second auto-cropped images based on the movement of the first panel of the laptop computer with respect to the second panel of the laptop computer about the one or more hinges of the laptop computer.

Also in various example embodiments, the input from the motion sensor may include input from a camera. So, for example, the first device may execute computer vision using the input from the camera to identify motion of the first device, with the first device rendering the second auto-cropped images based on the motion of the first device identified from the execution of computer vision.

Still further, in some example embodiments the input from the motion sensor may include input an inertial sensor such as an accelerometer, gyroscope, and/or magnetometer. So, for example, first device may execute dead reckoning to identify motion of the first device based on the input from the inertial sensor, with the first device rendering the second auto-cropped images based on the motion of the first device identified from the execution of dead reckoning.

In another aspect, a method includes auto-cropping base images from a camera on a first device to render respective first auto-cropped images having a first field of view that is smaller than a second field of view of the respective base images themselves. The method also includes receiving input from a motion sensor on the first device and, based on the input from the motion sensor, adjusting the auto-cropping of the base images from the camera to render second auto-cropped images having a third field of view. The third field of view is smaller than the second field of view, and the third field of view is different from the first field of view.

In some examples, the method may also include storing the first and second auto-cropped images as a video, and/or streaming the first and second auto-cropped images to a second device different from the first device.

Also in some examples, the method may include facilitating a video conference with a second device and auto-cropping the base images from the camera while facilitating the video conference to render the respective first auto-cropped images having the first field of view that is smaller than the second field of view of the respective base images themselves. The method may also include providing the first auto-cropped images to the second device as part of facilitating the video conference and, during the video conference, receiving the input from the motion sensor on the first device. Thus, here the method may include adjusting the auto-cropping of the base images from the camera to render the second auto-cropped images having the third field of view based on the input from the motion sensor. The method may then include providing the second auto-cropped images to the second device as part of facilitating the video conference.

In various example implementations, the first and second auto-cropped images may keep an object shown in the base images centered within the respective first and third fields of view. Also, if desired the first and second auto-cropped images may show different parts of a background behind the object.

Also in various example implementations, the input from the motion sensor may include input from a potentiometer, input from a camera, input from an accelerometer, input from a gyroscope, and/or input from a magnetometer.

In still another aspect, at least one computer readable storage medium (CRSM) that is not a transitory signal includes instructions executable by at least one processor to auto-crop base images from a camera on a first device to render respective first auto-cropped images having a first field of view that is smaller than a second field of view of the respective base images themselves. The instructions are also executable to receive input from a motion sensor on the first device and, based on the input from the motion sensor, adjust the auto-cropping of the base images from the camera to render second auto-cropped images having a third field of view. The third field of view is smaller than the second field of view, and the third field of view is different from the first field of view.

In various example embodiments, the first and second auto-cropped images may keep an object shown in the base images centered within the respective first and third fields of view.

Also in various example embodiments, the input from the motion sensor may include input from a potentiometer, a camera, an accelerometer, a gyroscope, and/or a magnetometer.

The details of present principles, both as to their structure and operation, can best be understood in reference to the accompanying drawings, in which like reference numerals refer to like parts, and in which:

DETAILED DESCRIPTION

Consistent with present principles, video auto-cropping (sometimes referred to as face-framing, crop window detection, or auto-framing) can be used for a close crop of a video onto a subject, such as for video conferencing, to help center the subject in the FOV provided to others. The camera may therefore be a fixed camera in a meeting room or conference room, for example, and may have a field of view wide enough to capture the whole room. Or the camera may be a selfie camera, world-facing camera, and/or a camera on a mobile device such as a personal computer, tablet, wearable device, or smartphone. As described further below, auto-cropping (e.g., for face-framing in the center of the crop) can account for device motion, with the crop FOV still being smaller than the camera's overall FOV. With device motion awareness, the crop window may therefore be updated faster and more accurately since, for example, the motion data may update more frequently than the ROI finder data.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino CA, Google Inc. of Mountain View, CA, or Microsoft Corp. of Redmond, WA. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any single- or multi-chip processor that can execute logic by means of various lines such as address lines, data lines, and control lines and registers and shift registers. Moreover, any logical blocks, modules, and circuits described herein can be implemented or performed with a system processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, solid state drive, CD ROM, or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library. Also, the user interfaces (UI)/graphical UIs described herein may be consolidated and/or expanded, and UI elements may be mixed and matched between UIs.

Logic when implemented in software, can be written in an appropriate language such as but not limited to hypertext markup language (HTML)-5, Java/JavaScript, C # or C++, and can be stored on or transmitted from a computer-readable storage medium such as a random access memory (RAM), read-only memory (ROM), electrically erasable programmable read-only memory (EEPROM), a hard disk drive or solid state drive, compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, NC, or a workstation computer, such as the ThinkStation®, which are sold by Lenovo (US) Inc. of Morrisville, NC; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

Figure 1:
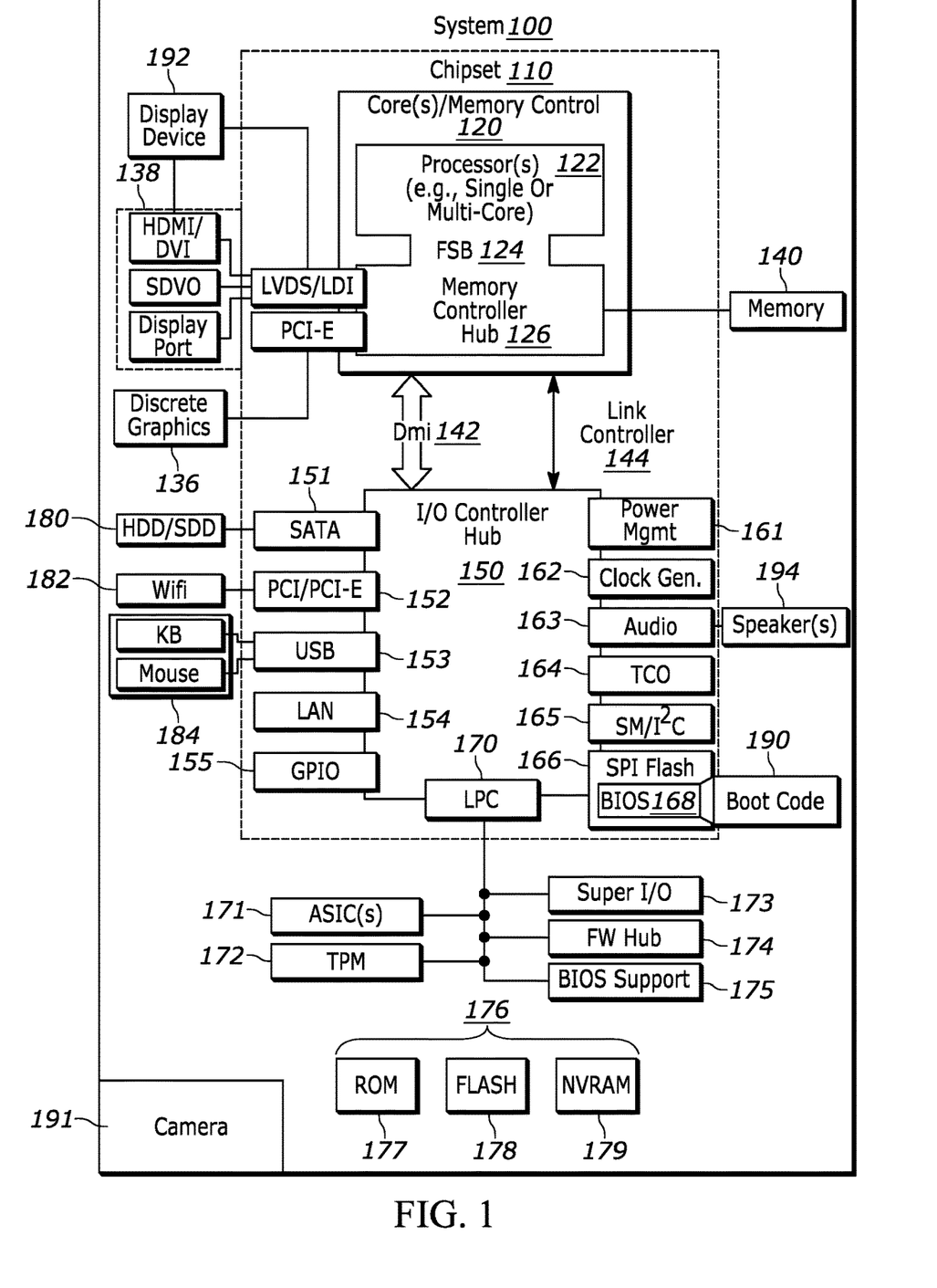
FIG. 1 is a block diagram of an example system consistent with present principles.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode (LED) display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (x16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more universal serial bus (USB) interfaces 153, a local area network (LAN) interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes basic input/output system (BIOS) 168 and boot code 190. With respect to network connections, the I/O hub controller 150 may include integrated gigabit Ethernet controller lines multiplexed with a PCI-E interface port. Other network features may operate independent of a PCI-E interface. Example network connections include Wi-Fi as well as wide-area networks (WANs) such as 4G and 5G cellular networks.

The interfaces of the I/O hub controller 150 may provide for communication with various devices, networks, etc. For example, where used, the SATA interface 151 provides for reading, writing, or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

As also shown in FIG. 1, the system 100 may include a camera 191 that gathers one or more images and provides the images and related input to the processor 122. The camera 191 may be a thermal imaging camera, an infrared (IR) camera, a digital camera such as a webcam, a three-dimensional (3D) camera, and/or a camera otherwise integrated into the system 100 and controllable by the processor 122 to gather still images and/or video.

However, further note that the component 191 may include another type of motion sensor as well, such as those described below. For instance, the component 191 may include an inertial measurement unit having a gyroscope that senses and/or measures the orientation of the system 100 and provides related input to the processor 122, an accelerometer that senses acceleration and/or movement of the system 100 and provides related input to the processor 122, and/or a magnetometer that senses and/or measures directional movement of the system 100 and provides related input to the processor 122. Additionally or alternatively, the motion sensor may be a global positioning system (GPS) transceiver that is configured to communicate with satellites to receive/identify geographic position information and provide the geographic position information to the processor 122 to indicate device motion to the processor 122 for auto-cropping consistent with present principles. However, it is to be understood that another suitable position receiver other than a GPS receiver may be used in accordance with present principles to determine the location and movement of the system 100.

Still further, though not shown, the system 100 may include an audio receiver/microphone that provides input from the microphone to the processor 122 based on audio that is detected, such as via a user providing audible input to the microphone as part of video conferencing or generating other types of audio/video content.

It is to be understood that an example client device or other machine/computer may include fewer or more features than shown on the system 100 of FIG. 1. In any case, it is to be understood at least based on the foregoing that the system 100 is configured to undertake present principles.

Figure 2:
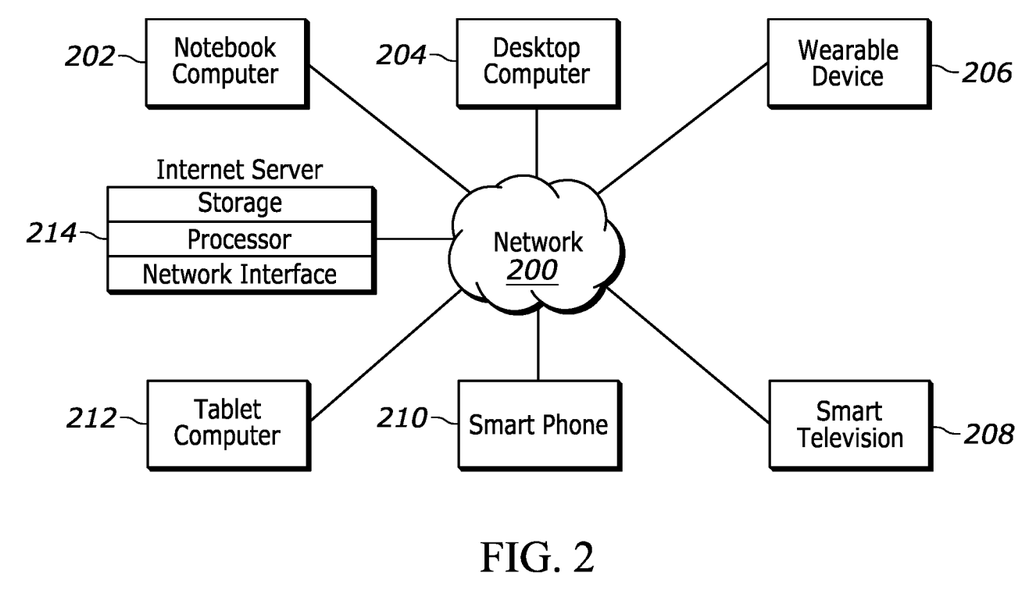
FIG. 2 is a block diagram of an example network of devices consistent with present principles.

Turning now to FIG. 2, example devices are shown communicating over a network 200 such as the Internet in accordance with present principles, such as for video conferencing or uploading a stored video to a video-sharing website. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch or AR/VR device, a smart television (TV) 208, a smart phone 210, a tablet computer 212, and a server 214 such as an Internet server that may provide cloud storage accessible to the devices 202-212. It is to be understood that the devices 202-214 may be configured to communicate with each other over the network 200 to undertake present principles.

Figure 3:
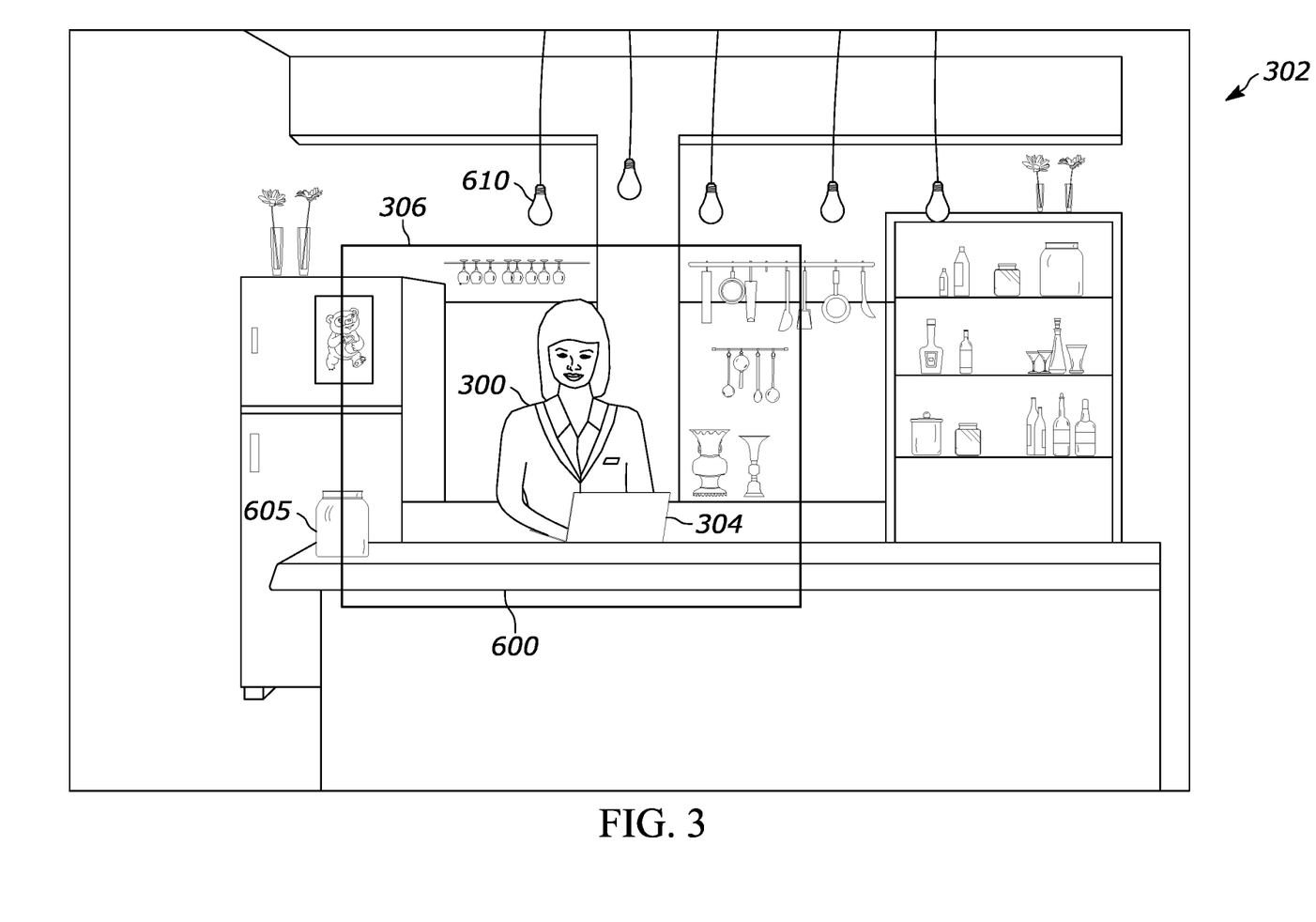
FIG. 3 shows an example base image from a camera consistent with present principles.

Now in reference to FIGS. 3-6, suppose a user 300 is video conferencing with one or more other people that are remotely-located from the user 300. FIG. 3 shows an example base image 302 that may be received from a smartphone camera in the user's environment that is being used to stream video of the user 300 as part of the video conference. The user 300 is also using a connected device 304 for viewing the other participants' video streams via the display of the device 304, and for streaming audio of the user 300 using a built-in microphone on the device 304 (the connected device 304 being a laptop computer in this example).

The base image(s) for the user's video stream may be, for example, raw images from the camera. Or they may be images from the camera that have been pre-processed by the camera's firmware, driver, or an operating system prior to being provided to the locally-executing video conferencing application or other video processing software. The base image(s) may have been generated using a wide-angle FOV camera and/or high-resolution camera (or otherwise generated using a digital camera with a fuller/wider field of view than the eventually-cropped images themselves).

As shown in FIG. 3, an example crop window 306 demonstrates the bounds of the auto-cropping performed by the smartphone or laptop 304 relative to the base images themselves (including base image 302). And note that the auto-cropping itself may be executed by the device to keep a region of interest (ROI) centered vertically and/or horizontally within the cropped images. For example, object recognition may be executed to identify a predetermined living or inanimate object as the ROI that is to be centered (e.g., per the present example, facial recognition in particular may be executed to identify a face of a person as the ROI to keep centered in the cropped images). In certain examples, the device may even zoom in on part of the base image(s) so that only a threshold amount of border around the ROI is used for the cropped images (e.g., another one hundred image pixels above, below, and to each side of the respective uppermost, lowermost, left-most, and right-most boundary of the ROI).

Figure 4:
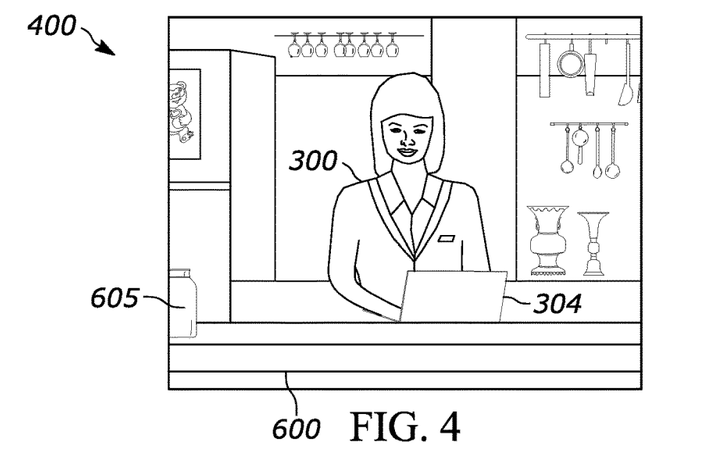
FIGS. 4-6 show various auto-cropping results consistent with present principles.

FIG. 4 shows an image 400 representing a first set of auto-cropped images that have an auto-cropped FOV delineated by the example crop window 306 of FIG. 3. Again note per this example that the first auto-cropped images are being streamed to the other devices of the other video conference participants, and so the face of the user 300 is being used as the ROI. Also note that the face of the user 300 is centered within the image 400 as shown in FIG. 4.

Figure 5:
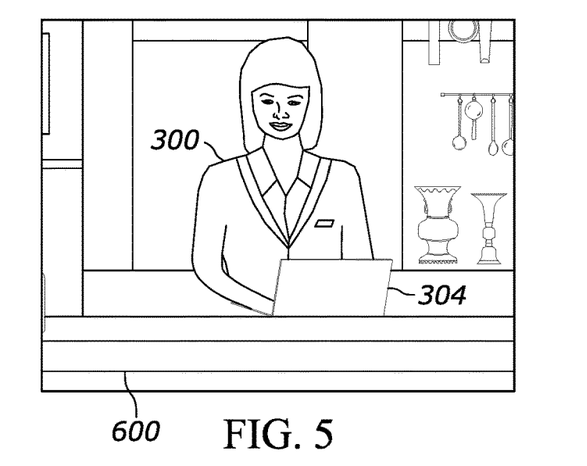

Now suppose that the smartphone (having the camera being used for streaming video of the face of the user 300 to others) is moved to the right and down relative to its current outward-facing camera viewing angle but that the video conferencing software's image analysis (or image analysis executed by other software) has not yet updated to accurately auto-crop based on the new viewing angle, and so the crop window is still established by the same camera pixel coordinates as before. Absent present principles, this would lead to an output where images of the video stream are not adequately auto-cropped to keep the user's face centered as the ROI. This is shown in FIG. 5, where the face/ROI is not centered.

Figure 6:
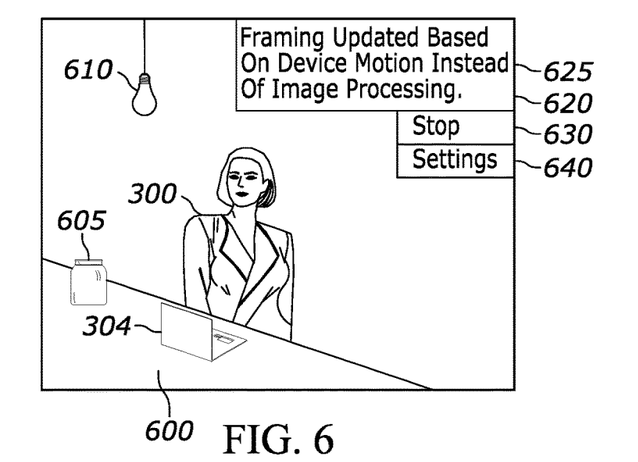

To address this, present principles may be employed where device motion may be sensed via one or more motion sensors on the smartphone itself to dynamically/proactively adjust the auto-cropping based on the smartphone's motion while or until the video conferencing software's image analysis catches up. FIG. 6 thus shows that video processing software may, based on the smartphone's motion down and to the right, be executed to render a second set of auto-cropped images that have a different FOV than the first set of auto-cropped images. Accordingly, even though the viewing angle to the user 300 has changed so that, rather than facing the user more head-on as shown in FIG. 4, the camera's FOV shows more of the left side of the user's face according to the new viewing angle/FOV, the ROI may remain centered in the second set of auto-cropped images.

Also note here that even though the ROI (the user's face) continues to be centered in the cropped images, the second set of cropped images shows different parts of a background behind the user 300 relative to the first set of cropped images. For example, owing to the smartphone being moved to the right as described above, more of the countertop 600 to the right of the user 300 themselves is shown in the second set of images, and a jar 605 is now fully shown along with it (the jar 605 only being partially shown in the first set). Additionally, owing to the smartphone also being moved down as described above, a hanging light 610 above the user 300 is now shown in the second set, with the second set also showing the countertop 600 extending at a different angle (more diagonal per the present example). Further note here that although a real-life background is being shown in the first and second sets of images, a 3D virtual background may be similarly adjusted according to device movement if a 3D virtual background is being applied as part of the image processing (e.g., to occlude real-life parts of the camera images other than the ROI).

Additionally, note that the second set of images (and first set, for that matter) may be presented on the display of the laptop computer 304 itself for the user 300 to view themselves while also video conferencing with others. Thus, suppose for a moment that FIG. 6 represents the second set of images as presented as part of a graphical user interface (GUI) 620 presented on the display of the laptop 304.

The GUI 620 may include an indication/notification 625 that auto-framing has been updated based on device motion instead of image processing. The GUI 620 may also include a stop/disable selector 630 that may be selectable based on touch or cursor input to disable auto-cropping based on device motion for a default or user-specific period of time, for the duration of that particular video conference, or for an indefinite period of time (e.g., until the user turns it back on again), depending on desired implementation. For example, the user may turn it back on again through a settings GUI like the GUI 800 that will be described later. The GUI 800 itself may be reached by, for example, selecting a settings selector 640 also presented as part of the GUI 620 so that the user may access end-user-configurable settings related to auto-cropping based on device motion. Last, before moving on to FIG. 7, further note that the graphical elements 625, 630, 640 may be presented on the laptop's display responsive to identifying motion of the smartphone, and/or responsive to the smartphone or laptop beginning to render the second set of auto-cropped images themselves.

Figure 7:
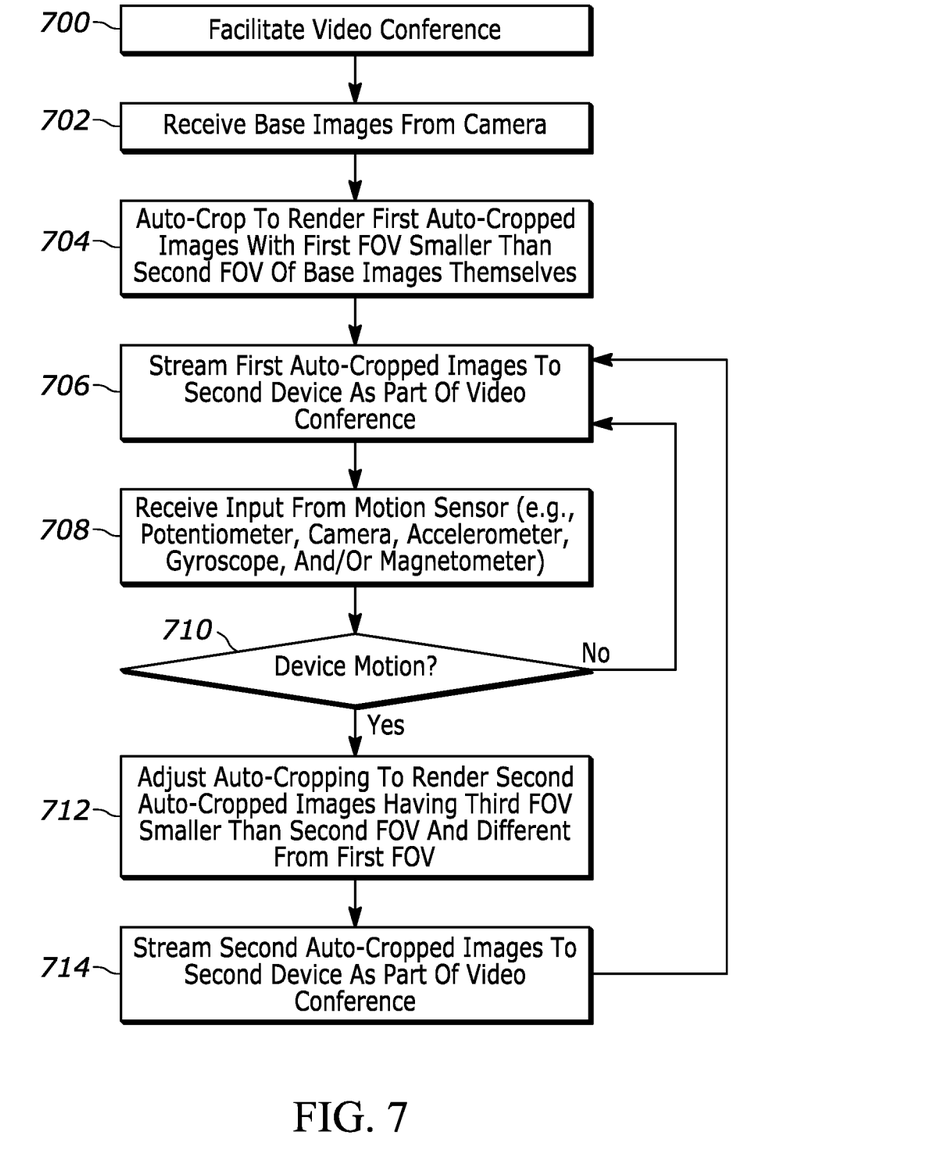
FIG. 7 illustrates example logic in example flow chart format that may be executed by a device consistent with present principles.
Figure 8:
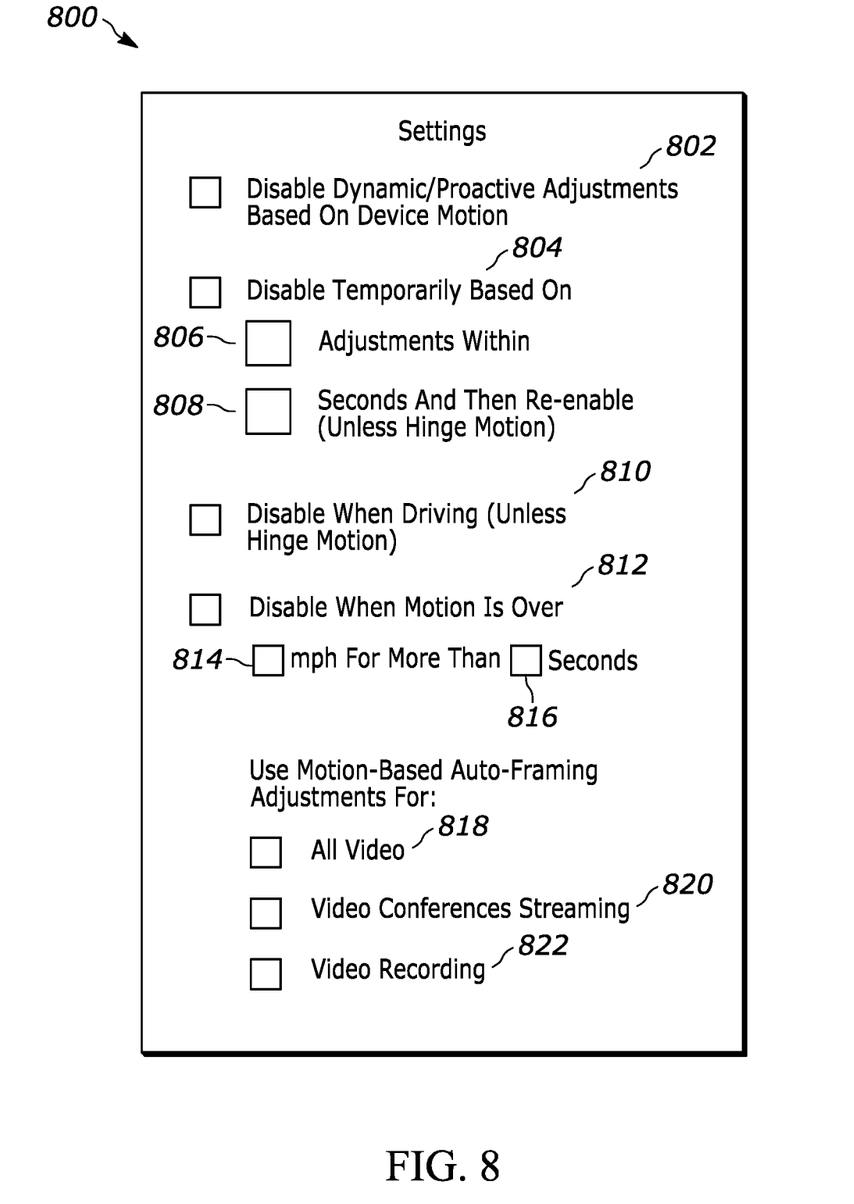
FIG. 8 shows an example graphical user interface (GUI) that may be presented on a display to configure one or more settings of a device to operate consistent with present principles.

Now in reference to FIG. 7, it shows example logic consistent with present principles that may be executed by a device such as the system 100, laptop and/or smartphone of FIGS. 3-6, and/or a remotely-located server in any appropriate combination. Note that while the logic of FIG. 7 is shown in flow chart format, other suitable logic may also be used.

Beginning at block 700, the device may facilitate a video conference by transmitting audio video (A/V) content and metadata between conferencing devices, such as a client device transmitting its local camera and microphone streams to others and also receiving camera and microphone streams from other client devices of other participants for local presentation. Or at block 700, a coordinating server may route the A/V communications between the devices and control one or more conferencing-related GUIs presented locally at client devices of the respective participants. From block 700 the logic may then proceed to block 702.

At block 702 the device may receive base images from a camera on or in communication with the device. The logic may then proceed to block 704 where, while facilitating the video conference, the device may auto-crop the base images from the camera to render respective first auto-cropped images having a first FOV that is smaller than a second FOV of the respective base images themselves. The logic may then move to block 706 where the device may stream the first auto-cropped images in real time as part of the video conference to at least a second device being used by another person to participate in the video conference.

The logic may then proceed to block 708 where, also during the video conference, the device may receive input from a motion sensor on the device with the camera from which the base images are received, whether the camera is a stand-alone camera with motion sensors, a smartphone camera as described above in reference to FIGS. 3-6, or a camera on another type of device. From block 708 the logic may then proceed to decision diamond 710.

At diamond 710 the device may determine whether, based on the input, device motion has actually occurred/been detected. The motion itself might be the result of the local video conference participant or another person physically moving the camera-bearing device. A negative determination at diamond 710 may cause the logic to proceed back to block 706 to proceed again therefrom. However, an affirmative determination at diamond 710 may instead cause the logic to proceed to block 712. At block 712 the device may, based on the input from the motion sensor(s), adjust the auto-cropping of the base images from the camera to render second auto-cropped images having a third FOV. The third FOV may be smaller than the second FOV of the base images themselves, and the third FOV may also be different from the first FOV of the first auto-cropped images. In some specific examples, the third FOV might even zoom in or out relative to the first FOV, but still be smaller than the second FOV. The logic may then proceed to block 714 where, as part of facilitating the video conference, the second auto-cropped images may be streamed to the second device. If desired, the logic may then revert back to block 706 as the second auto-cropping might only be momentarily different from the first auto-cropping.

Providing examples of various particular motion sensors and techniques that may be used in conjunction with the description above, in one example embodiment the device of FIG. 7 may be a laptop computer, the motion sensor may be a potentiometer, and therefore the input from the motion sensor received at block 708 may be input from the potentiometer. The potentiometer may be located at the hinge(s) of the laptop where the upper panel (with the laptop's display and camera on the inner face of the upper panel) connects to the lower panel (with a keyboard, track pad, and other components) for rotation of the upper panel with respect to the lower panel about the hinge axis.

Thus, input from the potentiometer may be used by the laptop's processor to identify a certain amount radial movement of the upper panel with respect to the lower panel to then map that movement to a different field of view for the ROI based on the known, fixed location of the laptop's camera within the laptop itself to thus render the second auto-cropped images based on the movement of the first panel with respect to the second panel. For example, if the laptop is already open and the upper panel is moved farther up away from a surface like a countertop while the lower panel still rests on the surface, the angle of hinge adjustment may be applied to identify camera pixels lower down on the camera that would now show the ROI according to the new camera viewing angle for those lower pixels to then be used as the camera pixels of the crop window, thus maintaining the ROI within the center of the crop window despite the different camera viewing angle. Further note here that other types of hinge movement/position sensors besides potentiometers may also be used, such as a position encoder, shaft encoder, or accelerometers on each side of the hinge and/or panels.

As another example, the motion sensor may be the camera itself from which the base images are received. Thus, the device may execute computer vision using the input from the camera to identify motion of the first device so that the device may render the second auto-cropped images based on the motion of the device as identified from the execution of computer vision. So, for example, optical location tracking and/or inside-out tracking specifically may be used. Note here that the input from the camera for location tracking may still be processed quicker and with less power consumption than the execution of object/facial identification for keeping the ROI centered in the cropped images (and/or may be already processed for another reason/purpose, so the device can take advantage of it already having been done for the other purpose without consuming additional power and processing resources).

As yet another example, the motion sensor may be a sensor from the device's inertial measurement unit, such as an accelerometer, a gyroscope, and/or a magnetometer. Thus, the device may execute dead reckoning using the input to identify motion of the device based on the input from the accelerometer, gyroscope, and/or magnetometer to render the second auto-cropped images based on the motion of the device as identified from the execution of dead reckoning.

Continuing the detailed description in reference to FIG. 8, it shows an example GUI 800 that may be presented on the display of a client device such as a smartphone or laptop to set/configure one or more settings of the client device to operate consistent with present principles. For example, the GUI 800 may be presented on the display of the device that undertakes the logic of FIG. 7. The GUI 800 may be reached by, for example, navigating a main settings menu of the device or its operating system, or navigating a settings menu for a video recording application, social media application, video conferencing application, etc. to configure one or more settings related to image cropping. Also note that in the example shown, each option discussed below may be selected by directing touch, cursor, or other input to the respective check box adjacent to the respective option.

As shown in FIG. 8, the GUI 800 may include a first option 802 that may be selectable a single time to disable the device, system, software, etc. from undertaking present principles (to disable dynamic/proactive crop adjustments based on device motion). The feature may then be re-enabled at a later time by un-checking the check box. Thus, note here that crop adjustments based on device motion are enabled by default per this example, but in other examples they may not be enabled by default and instead the box for the option 802 may be checked to enable them in the future.

The GUI 800 may also include another option 804 that may be selectable to set or enable the device to temporarily disable crop adjustments based on device motion responsive to a threshold number of crop adjustments occurring within a predetermined amount of time (e.g., until the number of potential crop adjustments drops below the threshold number). Thus, numerical input may be directed to input box 806 for an end-user to establish the threshold number, while numerical input may be directed to input box 808 to establish the predetermined amount of time. Option 804 may be particularly useful for sensed device motion while the device is in a moving vehicle as will be described later. Also note that the option 804 indicates that the option 804 pertains to device motion other than hinge motion as described above since that type of motion would typically be intentional hinge movement the device should not ignore for crop adjustments.

FIG. 8 also shows that the GUI 800 may include an option 810 to set or enable the device to specifically disable crop adjustments based on device motion when the device detects itself as being within a moving vehicle. The device may detect as much based on being paired to a vehicle's on-board computer system, based on GPS coordinates indicating that the device is on a roadway, based on GPS coordinates indicating movement of more than a threshold amount (e.g., twenty miles an hour), etc. Thus, crop adjustments based on device motion may be disabled while the device undergoes movement while within a moving vehicle, as that might otherwise lead to false-positive crop adjustments that should not actually be performed. Further note that here too the option 810 may pertain to device motion other than hinge motion as described above since that type of motion would typically be intentional hinge movement the device should not ignore for crop adjustments.

The GUI 800 may also include an option 812 for the end-user to set specific motion parameters for which crop adjustments based on device motion should not be made. Thus, input box 814 may be used to establish a threshold speed the device senses for more than a threshold amount of time (established via input box 816) so that speed above the threshold speed for more than the threshold amount of time will not constitute device motion for which crop adjustments are performed.

In some examples, the GUI 800 may also include various options to select various situations in which crop adjustments based on device motion should be used. Thus, option

818 may be selected to do so for all video generated by the device's camera (e.g., where an ROI is to be centered). Option 820 may be selected to configure the device to specifically do so for video conferences and other video streaming (e.g., social media livestreaming, video broadcasting, etc.). Option 822 may be selected to configure the device to specifically do so for video recordings, such as when a user might open their camera application and record a video for local storage at the camera-bearing device itself.

Figure 9:
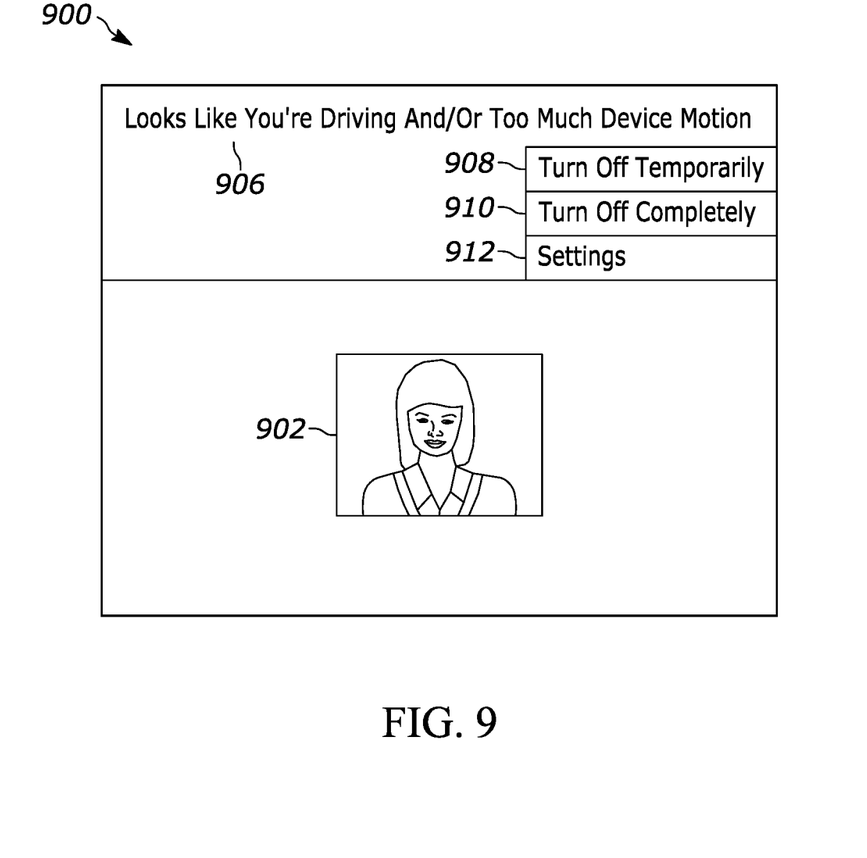
FIG. 9 shows an example GUI that may be presented when a device detects being within a moving vehicle or otherwise sensing relatively large device motion.

Turning now to FIG. 9, the present disclosure recognizes that there may be instances where a user might want crop adjustments based on device motion to be automatically disabled when the user is in a self-driving vehicle or other vehicle, because device motion to such a degree may cause crop jitters where too many adjustments are made to the video's cropping within too short an amount of time (leading to a disjoined video presentation). This might even occur outside the context of moving vehicles, hence the setting 812.

Thus, while driving or while the device otherwise undergoes such movement, the device may present the GUI 900 of FIG. 9, which may include video 902 of the user themselves or another person with whom the user is video conferencing. Then responsive to the device detecting being within a vehicle, and/or responsive to detecting motion above a threshold speed for more than a threshold amount of time, the GUI 900 may dynamically update to include an indication 906 that the device has identified the user as driving or has otherwise detected too much device motion (motion above the threshold speed for more than the threshold amount of time). So if the user wanted to just turn the auto-cropping based on device motion off in this situation, the user may select one of the selectors 908, 910 that may also be presented at the same time the indication 906 is presented.

The selector 908 may be selectable to set or configure the device to turn off auto-cropping based on device motion temporarily, such as until the device detects that the vehicle has stopped moving or that the speed drops below the speed threshold for the threshold amount of time. The selector 910 may be selectable to set or configure the device to turn off auto-cropping based on device motion completely (e.g., until the user re-enables it by, for example, unchecking the checkbox for the option 802 described above). In some examples, a selector 912 may also be presented to command the device to present the GUI 800 of FIG. 8 for additional configuration of device settings related to auto-cropping.

It may now be appreciated that present principles may be used to save device power and processor resources while still improving auto-cropping reaction time. Present principles therefore provide for an improved computer-based user interface that increases the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged, or excluded from other embodiments.

What is claimed is:

1. A first device, comprising:
at least one processor;
a camera accessible to the at least one processor; and
storage accessible to the at least one processor and comprising instructions executable by the at least one processor to:
facilitate a video conference with a second device;
while facilitating the video conference, auto-crop base images from the camera to render respective first auto-cropped images having a first field of view that is smaller than a second field of view of the respective base images themselves;
as part of facilitating the video conference, provide the first auto-cropped images to the second device;
during the video conference, receive input from a motion sensor on the first device;
based on the input from the motion sensor, adjust the auto-cropping of the base images from the camera to render second auto-cropped images having a third field of view, the third field of view being smaller than the second field of view, the third field of view being different from the first field of view; and
as part of facilitating the video conference, provide the second auto-cropped images to the second device.

2. The first device of claim 1, wherein the first and second auto-cropped images keep a person shown in the base images centered within the respective first and third fields of view.

3. The first device of claim 2, wherein the first and second auto-cropped images keep the person centered horizontally and vertically.

4. The first device of claim 2, wherein the first and second auto-cropped images show different parts of a background behind the person.

5. The first device of claim 1, wherein the first device comprises a laptop computer and wherein the input from the motion sensor comprises input from a potentiometer.

6. The first device of claim 5, wherein the input from the potentiometer indicates movement of a first panel of the laptop computer with respect to a second panel of the laptop computer about one or more hinges of the laptop computer, the first device rendering the second auto-cropped images based on the movement of the first panel of the laptop computer with respect to the second panel of the laptop computer about the one or more hinges of the laptop computer.

7. The first device of claim 1, wherein the input from the motion sensor comprises input from a camera, and wherein the first device executes computer vision using the input from the camera to identify motion of the first device, the first device rendering the second auto-cropped images based on the motion of the first device identified from the execution of computer vision.

8. The first device of claim 1, wherein the input from the motion sensor comprises input an inertial sensor, the inertial sensor selected from the group consisting of: an accelerometer, a gyroscope, a magnetometer.

9. The first device of claim 8, wherein the first device executes dead reckoning to identify motion of the first device based on the input from the inertial sensor, the first device rendering the second auto-cropped images based on the motion of the first device identified from the execution of dead reckoning.

10. A method, comprising:
auto-cropping base images from a camera on a first device to render respective first auto-cropped images having a first field of view that is smaller than a second field of view of the respective base images themselves;

receiving input from a motion sensor on the first device; and based on the input from the motion sensor, adjusting the auto-cropping of the base images from the camera to render second auto-cropped images having a third field of view, the third field of view being smaller than the second field of view, the third field of view being different from the first field of view.

11. The method of claim 10, comprising one or more of: storing the first and second auto-cropped images as a video, streaming the first and second auto-cropped images to a second device different from the first device.

12. The method of claim 10, comprising:

facilitating a video conference with a second device;

while facilitating the video conference, auto-cropping the base images from the camera to render the respective first auto-cropped images having the first field of view that is smaller than the second field of view of the respective base images themselves;

as part of facilitating the video conference, providing the first auto-cropped images to the second device;

during the video conference, receiving the input from the motion sensor on the first device;

based on the input from the motion sensor, adjusting the auto-cropping of the base images from the camera to render the second auto-cropped images having the third field of view; and as part of facilitating the video conference, providing the second auto-cropped images to the second device.

13. The method of claim 10, wherein the first and second auto-cropped images keep an object shown in the base images centered within the respective first and third fields of view.

14. The method of claim 13, wherein the first and second auto-cropped images show different parts of a background behind the object.

15. The method of claim 10, wherein the input from the motion sensor comprises input from a potentiometer.

16. The method of claim 10, wherein the input from the motion sensor comprises input from a camera.

17. The first device of claim 10, wherein the input from the motion sensor comprises input from one or more of: an accelerometer, a gyroscope, a magnetometer.

18. At least one computer readable storage medium (CRSM) that is not a transitory signal, the at least one computer readable storage medium comprising instructions executable by at least one processor to:

auto-crop base images from a camera on a first device to render respective first auto-cropped images having a first field of view that is smaller than a second field of view of the respective base images themselves;

receive input from a motion sensor on the first device; and based on the input from the motion sensor, adjust the auto-cropping of the base images from the camera to render second auto-cropped images having a third field of view, the third field of view being smaller than the second field of view, the third field of view being different from the first field of view.

19. The CRSM of claim 18, wherein the first and second auto-cropped images keep an object shown in the base images centered within the respective first and third fields of view.

20. The CRSM of claim 18, wherein the input from the motion sensor comprises input from one or more of: a potentiometer, a camera, an accelerometer, a gyroscope, a magnetometer.

* * * * *